United States Patent [19]

Hosonuma et al.

[11] Patent Number: 6,055,014
[45] Date of Patent: Apr. 25, 2000

[54] CONTROL APPARATUS AND CONTROL METHOD

[75] Inventors: Naoyasu Hosonuma, Saitama; Masakazu Koyanagi; Tadafusa Tomitaka, both of Chiba, all of Japan

[73] Assignee: Sony Corporation, Tokyo, Japan

[21] Appl. No.: 08/880,431

[22] Filed: Jun. 23, 1997

[30] Foreign Application Priority Data

Jun. 28, 1996 [JP] Japan .................................. 8-168995

[51] Int. Cl.⁷ ........................................................ H04N 7/18
[52] U.S. Cl. ............................ 348/143; 348/169; 348/213
[58] Field of Search ..................................... 348/169, 143, 348/159, 211, 212, 213, 214

[56] References Cited

U.S. PATENT DOCUMENTS

| | | | |
|---|---|---|---|
| 4,112,818 | 9/1978 | Garehime | 348/143 |
| 5,111,288 | 5/1992 | Blackshear | 348/143 |
| 5,745,166 | 4/1998 | Rhodes | 348/143 |
| 5,808,670 | 9/1998 | Oyashiki | 348/143 |

*Primary Examiner*—Howard Britton
*Attorney, Agent, or Firm*—Frommer Lawerence & Haug, LLP; William S. Frommer; Dennis M. Smid

[57] ABSTRACT

An incorrect operation is prevented from occurring in a tracking system for keeping track of a photographic object and taking a picture of the photographic object. When a body which is most likely to be recognized incorrectly as a photographic object exists, pan/tilt driving is carried out on a lens block employed in the tracking system so that an optical axis of the lens block is brought into the range of an angle set as an allowed-drive range. By doing so, the lens block will never take a picture of the body. As a result, an incorrect operation can be prevented from occurring due to incorrect recognition of the body as a photographic object.

15 Claims, 11 Drawing Sheets

CONTROL APPARATUS AND CONTROL METHOD

BACKGROUND OF THE INVENTION

1. Field of the Invention

In general, the present invention relates to a control apparatus and a control method. In particular, the present invention relates to a control apparatus and a control method for controlling equipment such as a video camera so as to exclude undesired bodies from a desired picture of a photographic object being taken in a tracking operation carried out to follow the movement of the desired photographic object.

2. Description of the Related Art

In recent years, there has been provided a tracking system of a video camera for controlling the movement of the video camera so as to always place a photographic object at the center of the screen whereby the video camera is driven by using pan and tilt mechanisms so as to enable the video camera to follow the movement of a photographic object. The patent applicant of the present invention has proposed a tracking apparatus and a tracking method for keeping track of a photographic object without being affected by changes in environment as disclosed in Japanese Patent Laid-open No. Hei8-11654.

A tracking system of a video camera described above adopts a tracking method comprising the steps of identifying the characteristics of a photographic object, detecting the position of the photographic object, finding the amount of a displacement of the photographic object from the center of the screen and controlling a panning motor and a tilting motor so as to make the amount of the displacement equal to zero. The ranges of the panning and tilting movements which are each also referred to as a tracking range is determined only by the mechanism of the driving unit.

Also in a pan/tilter system for carrying out panning or tilting driving by manually operating a video camera, the tracking ranges of the panning and tilting are determined by only the mechanism of the driving unit.

In the tracking system of a video camera described above, however, the tracking ranges are determined only by the panning and tilting mechanisms which are referred to hereafter simply as a panning/tilting mechanism for the sake of convenience. As a result, when a body incorrectly recognizable with ease as a photographic object exists in a tracking range, in some cases, the tracking system inadvertently moves in a direction toward a location at which the body exists even if such incorrect recognition is known in advance, raising a problem that the video camera does not keep track of the photographic object, which should naturally be tracked, due to the incorrect recognition of the body and inadvertently takes a picture of the body.

In addition, in the pan/tilter system of a video camera described above, the tracking ranges are determined only by the panning/tilting mechanism. As a result, when a body, the image of which the user does not want to photograph or should not be taken or something like it exists in a tracking range, in some cases, the tracking system inadvertently moves in a direction toward a location of the body with ease due to an incorrect operation even if the existence of such a non-photographic object in the tracking range is known in advance, raising a problem that the video camera inadvertently takes a picture of the body.

SUMMARY OF THE INVENTION

The present invention addresses the problems described above. It is thus an object of the present invention to provide a control apparatus and a control method to be adopted in a video camera drivable in any direction within a predetermined range which are capable of limiting the driving range of the video camera.

According to a first aspect of the present invention, there is provided a control apparatus comprising:

an image taking means for photographing an image of a predetermined photographic object;

a driving means for driving said image taking means in any arbitrary direction;

a photographic-object detecting means for detecting a position of said photographic object on said image photo-graphed by said image taking means;

a first control means for controlling said driving means so as to minimize the magnitude of a displacement of said position of said photographic object detected by said photographic-object detecting means from a predetermined reference position on said image;

a dividing means for dividing a space photographable by said image taking means into a first space allowing said image taking means to photograph an image thereof and a second space inhibiting said image taking means from photographing an image thereof; and a second control means for finding a driving range allowing said image taking means to be driven therein and for driving said image taking means only within said driving range so as to prevent said image taking means from photographing an image of said second space.

According to a second aspect of the present invention, there is provided a control apparatus comprising:

an image taking means for photographing an image of a predetermined photographic object;

a driving means for driving said image taking means in any arbitrary direction;

a dividing means for dividing a space photographable by said image taking means into a first space allowing said image taking means to photograph an image thereof and a second space inhibiting said image taking means from photographing an image thereof;

a command issuing means for issuing a command specifying a driving direction of said image taking means;

a first control means for controlling said driving means so as to drive said image taking means in a driving direction specified by a command issued by said command issuing means; and a second control means for finding a driving range allowing said image taking means to be driven therein and for driving said image taking means only within said driving range so as to prevent said image taking means from photographing an image of said second space.

According to still a third aspect of the present invention, there is provided a control method comprising the steps of:

photographing an image of a predetermined photographic object by using a predetermined image taking means;

detecting a position of said photographic object on said image photographed by said image taking means;

controlling said driving means so as to minimize the magnitude of a displacement of said detected position of said photographic object from a predetermined reference position on said image;

dividing a space photographable by said image taking means into a first space allowing said image taking means to photograph an image thereof and a second space inhibiting said image taking means from photographing an image thereof; and finding a driving range allowing said image taking means to be driven therein and driving said image taking means only within said driving range so as to prevent said image taking means from photographing an image of said second space.

According to a fourth aspect of the present invention, there is provided a control method comprising the steps of:

photographing an image of a predetermined photographic object by using a predetermined image taking means;

dividing a space photographable by said image taking means into a first space allowing said image taking means to photograph an image thereof and a second space inhibiting said image taking means from photographing an image thereof;

issuing a command specifying a driving direction of said image taking means;

controlling said driving means so as to drive said image taking means in a driving direction specified by said command; and finding a driving range allowing said image taking means to be driven therein and driving said image taking means only within said driving range so as to prevent said image taking means from photographing an image of said second space.

In the control apparatus according to the first aspect of the present invention, an image taking means photographs an image of a predetermined photographic object;

a driving means drives said image taking means in any arbitrary direction;

a photographic-object detecting means detects a position of said photographic object on said image photographed by said image taking means;

a first control means controls said driving means so as to minimize the magnitude of a displacement of said position of said photographic object detected by said photographic-object detecting means from a predetermined reference position on said image;

a dividing means divides a space photographable by said image taking means into a first space allowing said image taking means to photograph an image thereof and a second space inhibiting said image taking means from photographing an image thereof; and a second control means finds a driving range allowing said image taking means to be driven therein and drives said image taking means only within said driving range so as to prevent said image taking means from photographing an image of said second space.

In a control apparatus according to the second aspect of the present invention, an image taking means photographs an image of a predetermined photographic object;

a driving means drives said image taking means in any arbitrary direction;

a dividing means divides a space photographable by said image taking means into a first space allowing said image taking means to photograph an image thereof and a second space inhibiting said image taking means from photographing an image thereof;

a command issuing means issues a command specifying a driving direction of said image taking means;

a first control means controls said driving means so as to drive said image taking means in a driving direction specified by a command issued by said command issuing means; and a second control means finds a driving range allowing said image taking means to be driven therein and drives said image taking means only within said driving range so as to prevent said image taking means from photographing an image of said second space.

The control method according to the third aspect of the present invention comprises the steps of:

photographing an image of a predetermined photographic object by using a predetermined image taking means;

detecting a position of said photographic object on said image photographed by said image taking means;

controlling said driving means so as to minimize the magnitude of a displacement of said detected position of said photographic object from a predetermined reference position on said image;

dividing a space photographable by said image taking means into a first space allowing said image taking means to photograph an image thereof and a second space inhibiting said image taking means from photographing an image thereof; and finding a driving range allowing said image taking means to be driven therein and driving said image taking means only within said driving range so as to prevent said image taking means from photographing an image of said second space.

The control method according to the fourth aspect of the present invention comprises the steps of:

photographing an image of a predetermined photographic object by using a predetermined image taking means;

dividing a space photographable by said image taking means into a first space allowing said image taking means to photograph an image thereof and a second space inhibiting said image taking means from photographing an image thereof;

issuing a command specifying a driving direction of said image taking means;

controlling said driving means so as to drive said image taking means in a driving direction specified by said command; and finding a driving range allowing said image taking means to be driven therein and driving said image taking means only within said driving range so as to prevent said image taking means from photographing an image of said second space.

BRIEF DESCRIPTION OF THE DRAWINGS

Preferred embodiments of the present invention will be described in detail by referring to accompanying figures some of which show the embodiments wherein.

DETAILED DESCRIPTION OF THE PREFERRED EMBODIMENTS

Figure 1:
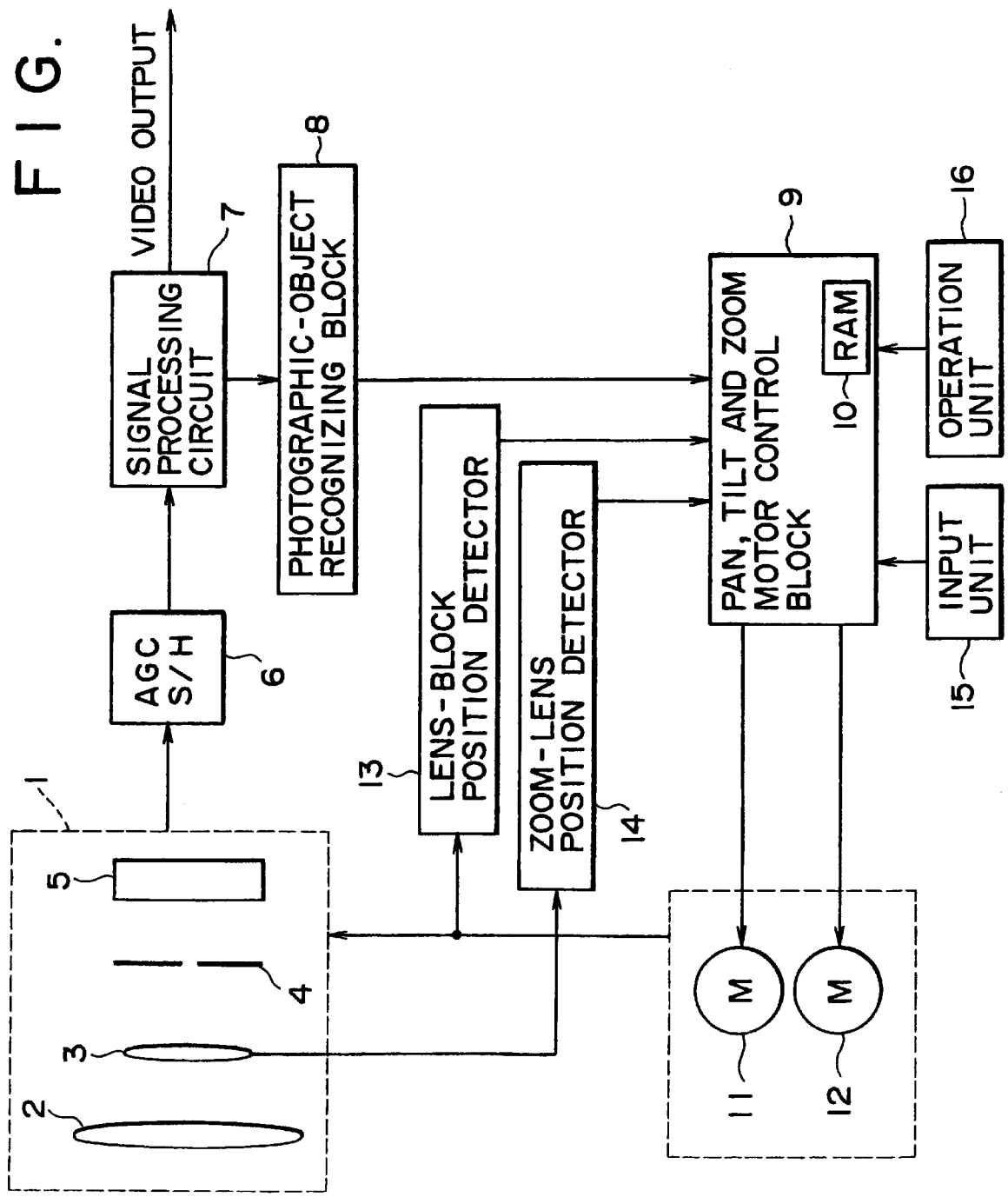
FIG. 1 is a block diagram showing a typical configuration of a tracking system to which a control apparatus provided by the present invention is applied.

The present invention will become more apparent from a study of the following detailed description of some preferred embodiments with reference to the accompanying diagrams some of which show the embodiments. FIG. 1 is a block diagram showing the configuration of an embodiment implementing an automatic tracking system provided by the present invention. As shown in the figure, a lens block (an image taking means) 1 comprises a lens 2, a zoom lens 3, an iris 4 and a CCD (Charge Coupled Device) 5 which serves as an image taking device. A panning motor 11 serving as a driving means and a tilting motor 12 also serving as a driving means as well are used for respectively panning and tilting the automatic tracking system. Photographic light coming from an angle of view including a photographic object is taken in through the lens 2, the zoom lens 3 and the iris 4, being projected as an image on the CCD 5. The CCD 5 outputs a signal representing the quantity of received light. The iris 4 has the so-called auto-iris (AE) mechanism for adjusting the quantity of received light to a proper value.

The signal representing the image created on the CCD 5 is supplied to an S/H (sample-hold)/AGC (Automatic Gain Control) circuit 6 which is referred to hereafter simply as an AGC circuit. In the AGC circuit 6, the signal is sampled and the sampled values are held. After undergoing gain control at a predetermined gain, the signal is supplied to a signal processing circuit 7. The signal processing circuit 7 carries out predetermined camera signal processing on the signal supplied by the AGC circuit 6, producing an image signal (or a video signal) to be output to a unit outside the automatic tracking system. Typically, the signal processing circuit 7 converts the signal supplied by the AGC circuit 6 into a digital signal. A luminance signal, a color-difference signal and a chroma signal for each picture element of the CCD 5 are generated in the signal processing circuit 7 to be finally converted into an analog signal. The analog signal is then supplied to a monitor not shown in the figure. In this way, an image taken by the lens block 1 can be displayed on the monitor.

The image signal (accurately speaking, the luminance signal and the color-difference signal) generated by the signal processing circuit 7 is supplied to a photographic-object recognizing block 8 serving as a photographic-object detecting means. The photographic-object recognizing block 8 determines the position of the photographic object on the screen and outputs data representing coordinates of the position on the screen. On the other hand, a lens-block position detector 13 detects the position of the lens block 1, outputting data representing the position. Likewise, a zoom-lens position detector 14 (or an angle-of-view detecting means) detects the position of the zoom lens 3, outputting data representing the position.

A motor control block 9, which comprises a first control means, a second control means, an angle-of-view detecting means and an adjustment means, receives the data representing coordinates of the position of a photographic object on the screen from the photographic-object recognizing block 8, the data representing the position of the lens block 1 from the lens-block detector 13 and the data representing the position of the zoom lens 3 from the zoom-lens position detector 14. The motor control block 9 controls a panning motor 11 and a tilting motor 12 in accordance with the data. The motor control block 9 has a RAM unit 10 for storing predetermined data including various kinds of control data input from an input unit 15 which serves as a separation means. An operation means 16 which serves as a command issuing means is used for manually operating the lens block 1 as will be described later.

The panning motor 11 drives the lens block 1 in a pan direction in accordance with a control signal supplied by the motor control block 9. On the other hand, the tilting motor 12 drives the lens block 1 in a tilting direction also in accordance with a control signal supplied by the motor control block 9.

Figure 2:
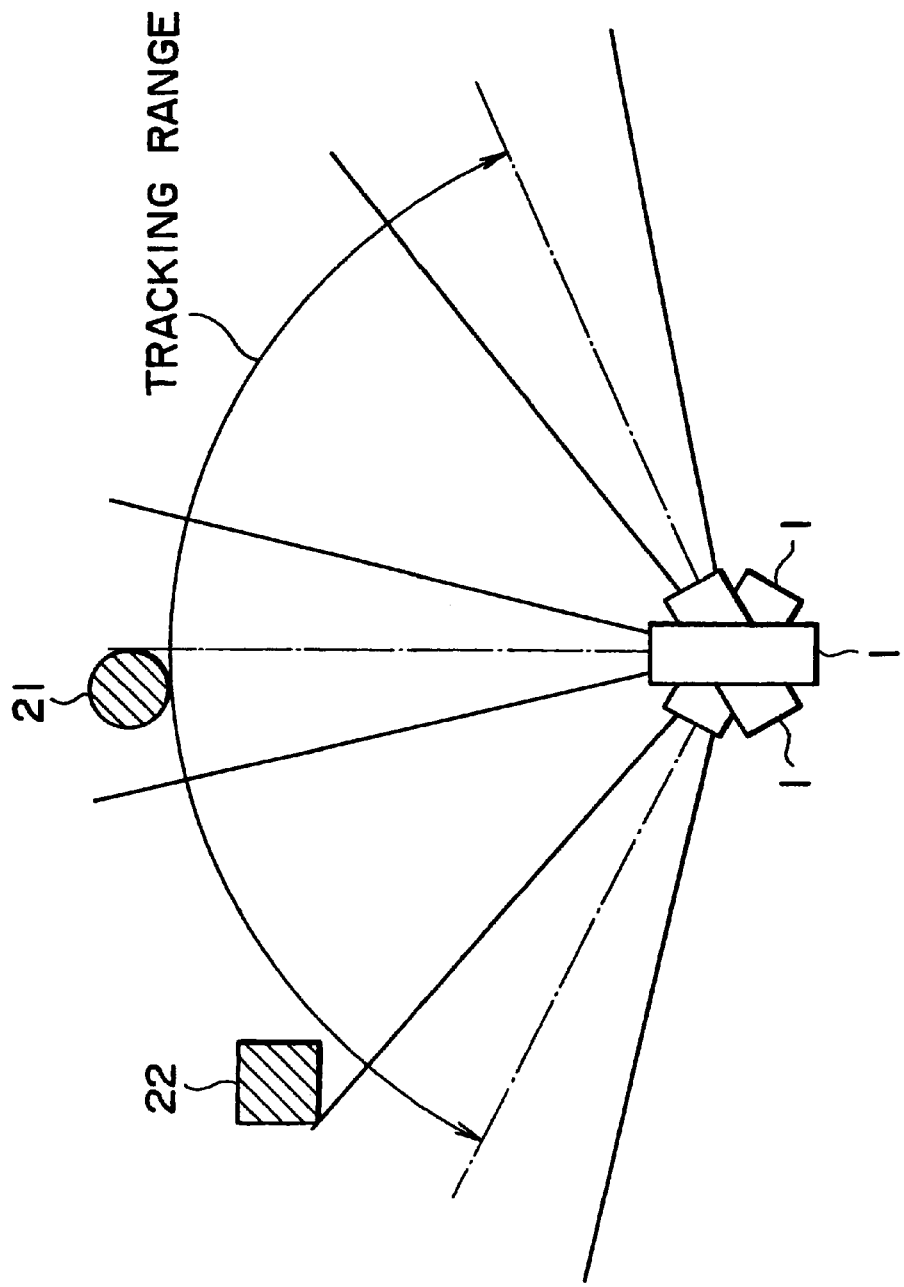
FIG. 2 is a diagram showing a tracking range of a lens block 1 employed in the tracking system shown in FIG. 1.

FIG. 2 is a diagram showing a positional relation among a tracking range (or a tracking zone) in which the lens block 1 can be driven, a body 22 and a photographic object 21. In order to make the explanation simple, only driving in the pan direction is taken into consideration in the following description. That is to say, only a case in which the lens block 1 is driven only by the panning motor 11 is considered. Driving in the tilting direction is basically the same as the driving in the pan direction. The body 22 can be appropriately regarded as a body 22 incorrectly recognizable with ease as a photographic object or a body 22, the image of which is not to be photographed.

As shown in FIG. 2, the tracking range is a range over which the optical axis of the driven lens block 1 indicated by a dotted line moves. In this case, both the photographic object 21 and the body 22 incorrectly recognizable with ease as a photographic object exist in the tracking range. When the lens block 1 is oriented in the direction toward the body 22, that is, a direction to the left, an image of the body 22 is taken, resulting in an incorrect recognition. As a result, the lens block 1 no longer keeps track of the photographic object 21 which should be tracked originally. Assume that, for example, the body 22 has a color similar to that of the photographic object 21 so that the body 22 is inadvertently recognized incorrectly as the photographic object 21.

Figure 3:
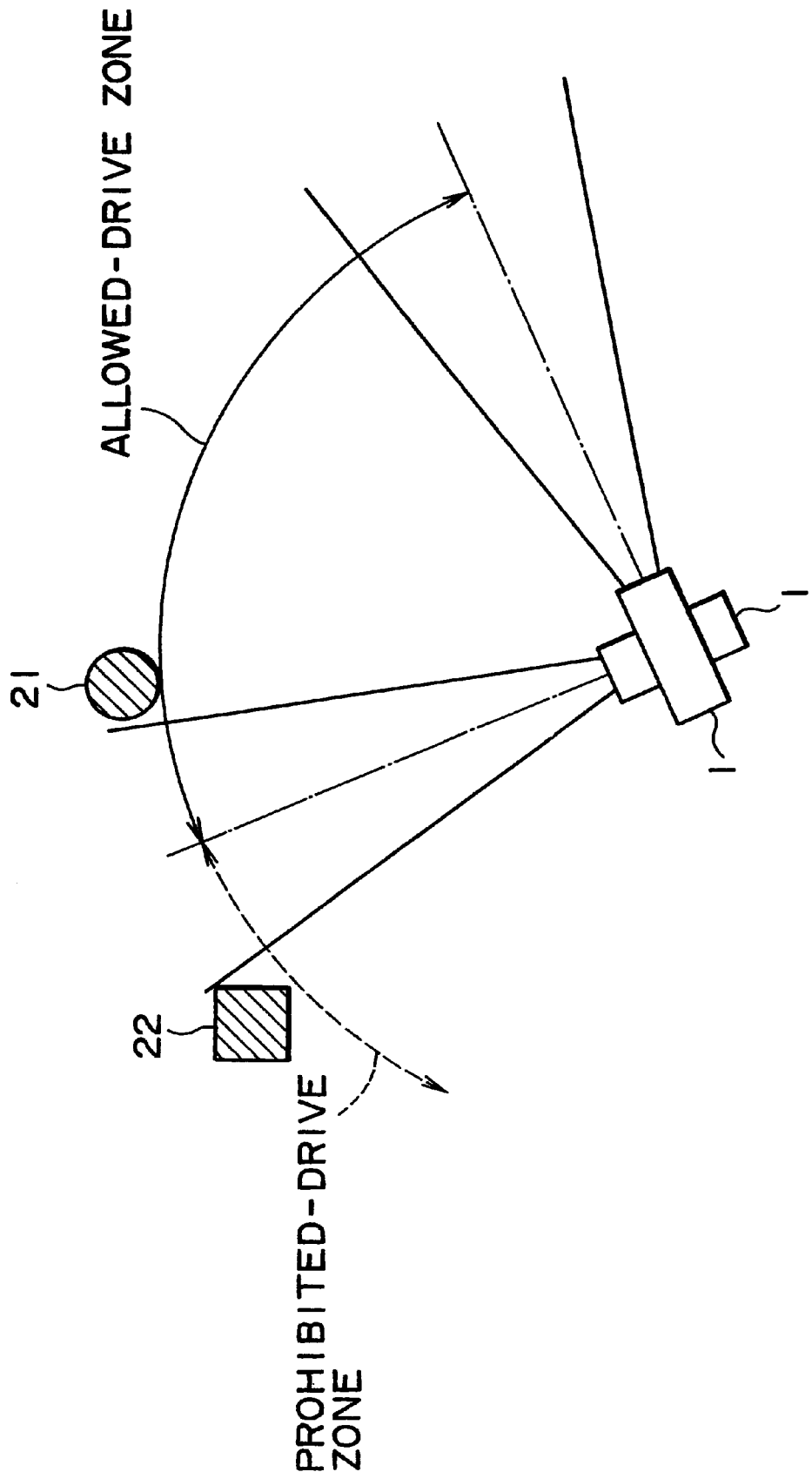
FIG. 3 is a diagram showing an allowed-drive range and a prohibited-drive range of the lens block 1.

In order to solve the problem described above, a limit is imposed on the tracking range so that the lens block 1 will not be driven to the left as shown in FIG. 3. In this way, the lens block 1 does not see the body 22 which can be recognized incorrectly as a photographic object 21 in its angle of view, preventing incorrect recognition.

That is to say, the tracking range is divided into an allowed-drive range (zone) and a prohibited-drive range (zone) as shown in FIG. 3. The motor control block 9 is controlled so that the optical axis of the lens block 1 is driven only in the range of the allowed-drive zone. By doing so, the image of the photographic object 21 can be taken by the lens block 1 but that of the body 22 will not be taken thereby.

If the orientation of the lens block 1 enters the prohibited-drive range inadvertently due to some reasons such as an external factor forcibly changing the orientation of the lens block 1, however, only driving of the lens block 1 in a direction returning to the allowed-drive range is permitted, disabling any driving in other directions. In this way, even if the worst comes to the worst, the lens block 1 will merely sustain the orientation thereof as it is and, if driven in some directions, the orientation of the lens block 1 approaches the allowed-drive range.

Figure 4:
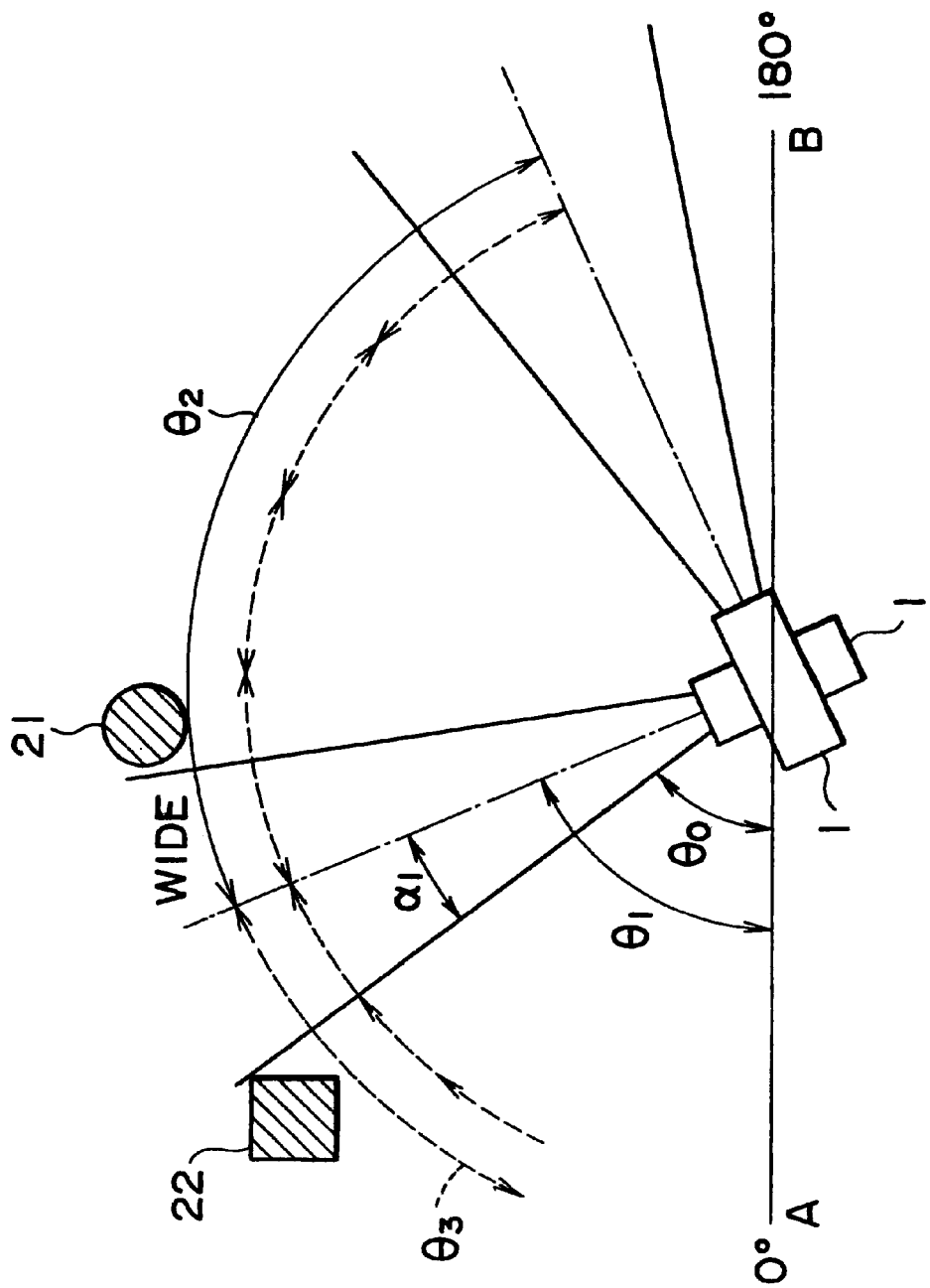
FIG. 4 is a diagram showing driving directions of the lens block 1 with the zoom set at a wide angle.

FIG. 4 is a diagram showing driving directions of the lens block 1. A solid line denoted by notation $\theta_2$ in the figure indicates the allowed-drive range and a dotted line denoted by notation $\theta_3$ is the prohibited-drive range. A thick-dotted-line arrow indicates a driving direction in which the lens block 1 can be driven. When the optical axis of the lens block 1 is in the prohibited-drive range $\theta_3$, for example, only driving the lens block 1 to the right is allowed. When the optical axis of the lens block 1 is in the allowed-drive range $\theta_2$, on the other hand, driving the lens block 1 to both the right and left is allowed.

Figure 5:
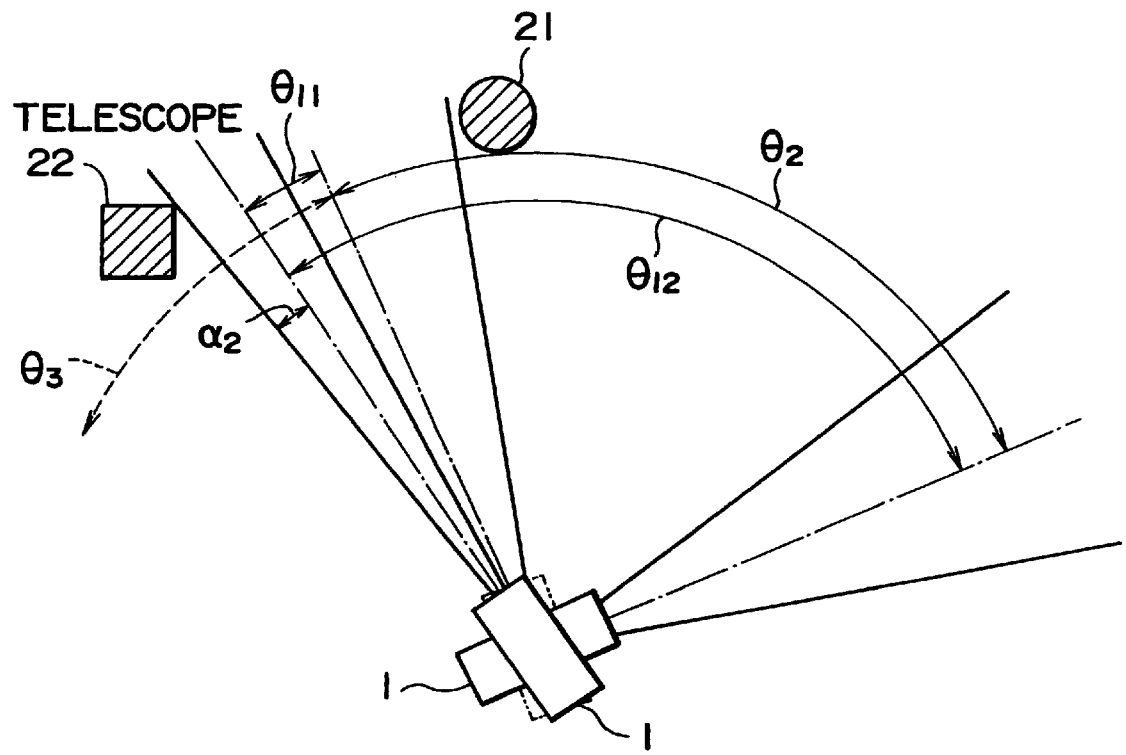
FIG. 5 is a diagram showing changes in allowed-drive range and prohibited-drive range with the zoom set a telescope angle.

In addition, if the angle of view changes, the allowed-drive range of the lens block 1 itself also varies in accordance with the change in angle of view. When the zoom lens 3 is driven into a wide angle as shown in FIG. 4 to set an angle of view with a magnitude of $2\times\alpha_1$ excluding the incorrectly recognizable body 22, for example, the allowed-drive range in which the lens block 1 can be driven is represented by the angle $\theta_2$. When the zoom lens 3 is driven into a telescope angle as shown in FIG. 5 to set an angle of view with a magnitude of $2\times\alpha_2$ excluding the recognized incorrectly body 22, on the other hand, the allowed-drive range in which the lens block 1 can be driven is represented by an angle $\theta_{12}$.

When the angle $\theta_2$ is compared with the angle $\theta_{12}$, it is obvious that the angle $\theta_{12}$ is greater than the angle $\theta_2$ by a difference equal to the difference between the angles of vision $2\times\alpha_1$ and $2\times\alpha_2$. That is to say, when the zoom lens 3 is driven into a telescope angle, the tracking range of the lens block 1 is widened to the left. When the zoom lens 3 is driven into a wide angle, on the hand, the tracking range of the lens block 1 is narrowed to the right.

By varying the allowed-drive range in accordance with the angle of view as described above, it is possible to prevent generation of a range in which the lens block 1 can be driven only in one direction, that is, the right direction in this case, in spite of the fact that the zoom lens 3 can be driven into a wide angle to form an angle of vision including the recognized incorrectly body 22 or driven into a telescope angle to form an angle of vision excluding the recognized incorrectly body 22.

Next, let the driving range of the lens block 1 for which the recognized incorrectly body 22 is not included in the angle of view $\alpha_1\times 2$ be expressed in terms of an angle formed by a line segment AB passing through a center of rotation C of the lens block 1 and the optical axis of the lens block 1. As shown in FIG. 4, when the zoom is wide, an image that can be taken by the lens block 1 is in a range beyond an angle $\theta_0$. An angle $\theta_1$ is an angle which is formed by the line segment AB and the optical axis of the lens block 1 when the lens block 1 is fully driven to the left. The angle $\theta_1$ is the sum of the angle $\theta_0$ and half the angle of view $\alpha_1$ with the lens block 1 driven fully to the left as expressed by the following equation:

$$\theta_1=\theta_0+\alpha_1 \quad (1)$$

Let $\beta$ represent an angle formed by the line segment AB and the optical axis of the lens block 1. If a relation (2) holds true, the lens block 1 can keep track of the photographic object 21 without including the recognized incorrectly body 22 in the angle of view.

$$\beta>\theta_1 \quad (2)$$

Figure 6:
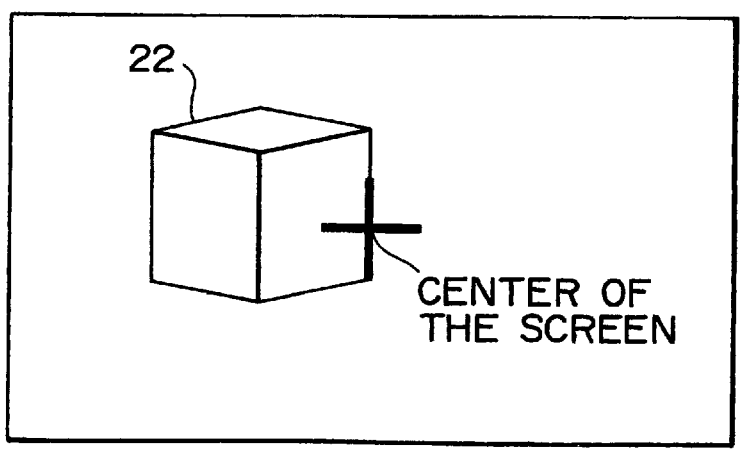
FIG. 6 is an explanatory diagram showing a method for finding an angle $\theta_0$ shown in FIG. 4.

Below is explanation of how the angle $\theta_0$ is found. First of all, the operation unit 16 is operated to drive the panning motor 11 and the tilting motor 12. In turn, the panning and tilting motors 11 and 12 drives the lens block 1 so as to place the right side of the recognized incorrectly body 22 at the center of the screen as shown in FIG. 6. In the mean time, the lens-block position detector 13 repeatedly carries out processing to detect the orientation of the lens block 1 which is represented typically by the angle formed by the line segment AB and the optical axis of the lens block 1. As the right side of the incorrectly recognized body 22 is placed at the center of the screen, the input unit 15 is operated to store the orientation of the lens block 1, that is, the angle formed by the line segment AB and the optical axis of the lens block 1, into the RAM unit 10 employed in the motor control block 9.

In the way described above, the angle $\theta_0$ is first of all found. The angle $\theta_0$ can also be found with the zoom set at a telescope angle as shown in FIG. 5 in the same way. That is to say, the angle $\theta_0$ has a predetermined value regardless of whether the zoom is set at a wide or telescope angle.

Figure 7:
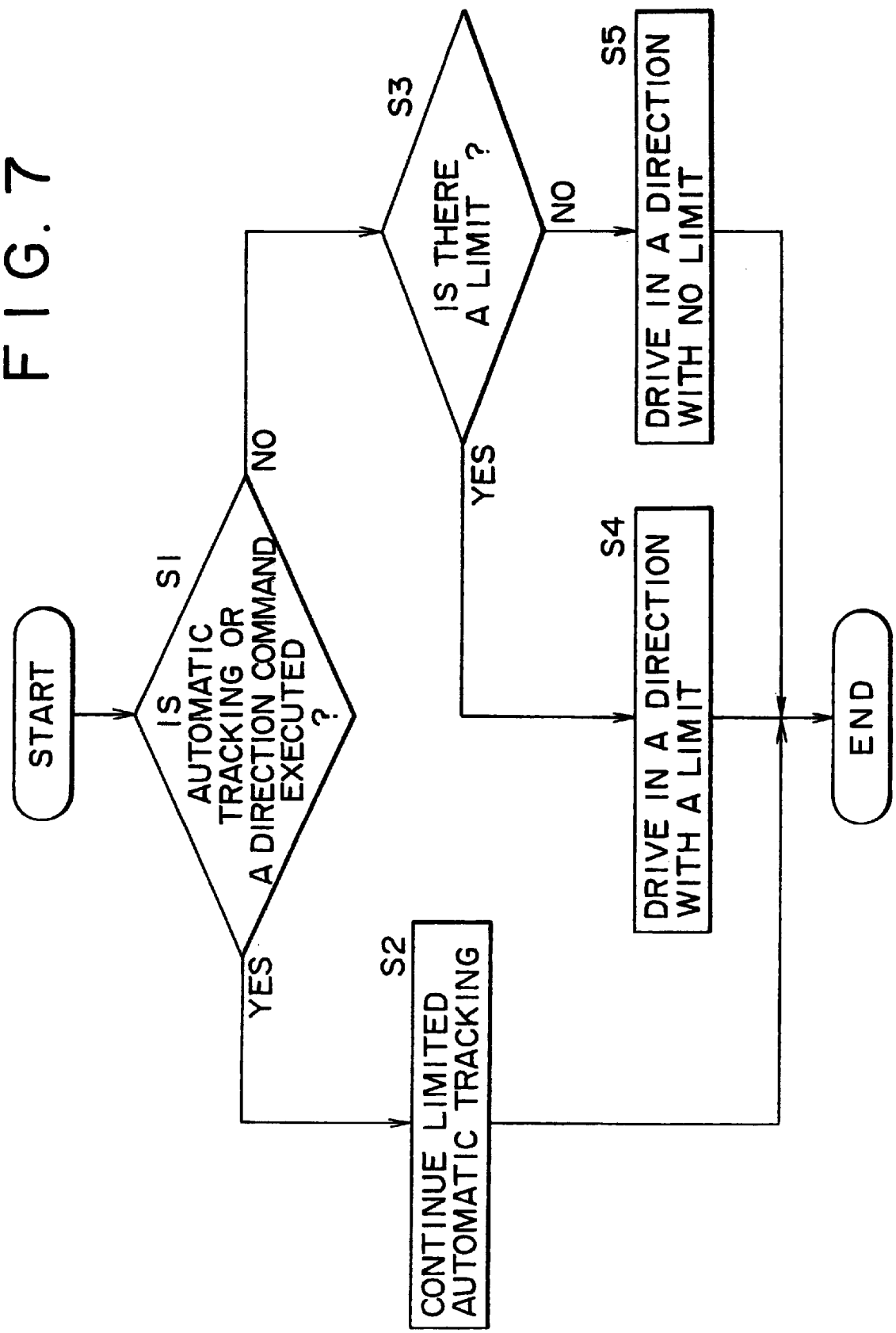
FIG. 7 is a schematic flow diagram used for explaining the operation of the tracking system shown in FIG. 1.

Next, the operation of the tracking apparatus is explained by referring to a flowchart shown in FIG. 7. As shown in the figure, the operational flow begins with a step S1 to form a judgment as to whether automatic tracking is being carried out by using the motor control block 9 or a command for driving the lens block 1 in a direction (or a direction command) is being executed by a manual operation. The judgment can be formed by determining whether or not a signal representing a predetermined operation is supplied from the operation unit 16. That is to say, when the user drives the lens block 1 by carrying out a manual operation, a control signal representing the manual operation performed by the user is supplied to the motor control block 9 by the operation unit 16.

No control signal supplied from the operation unit 16 indicates that automatic tracking is being carried out. In this case, the operational flow goes on to a step S2 at which a limit is imposed on the range of the automatic tracking. The operation carried out at the step S2 will be explained in detail later by referring to a flowchart shown in FIG. 8. After completing the step S2, the operation of the tracking apparatus is ended. If the tracking is not automatic, that is, if the outcome of the judgment formed at the step S1 indicates that a command for driving the lens block 1 in a direction is being executed as a result of a manual operation carried out on the operation unit 16, on the other hand, the operational flow proceeds to a step S3 to form a judgment as to whether a predetermined limit is imposed on the driving range by operating the input unit 15. That is to say, when the user manually operates the lens block 1 by using the operation unit 16, the user can select whether or not a limit is imposed on the driving range of the lens block 1.

If the outcome of the judgment formed at the step S3 indicates that a predetermined limit has been imposed on the driving range, the operational flow continues to a step S4 at which driving in directions up to the limit is carried out. In actuality, the lens block 1 is driven to the right and left within the allowed-drive range. The processing carried out at the step S4 will be explained later by referring to FIG. 8. If the outcome of the judgment formed at the step S3 indicates that no predetermined limit has been imposed on the driving range, on the other hand, the operational flow continues to a step S5 at which driving in directions with no limit is carried out. In actuality, the lens block 1 is driven to the right and left over the entire tracking range. As the processing at the step S4 or S5 is completed, the entire operation of the tracking system is ended.

Figure 8:
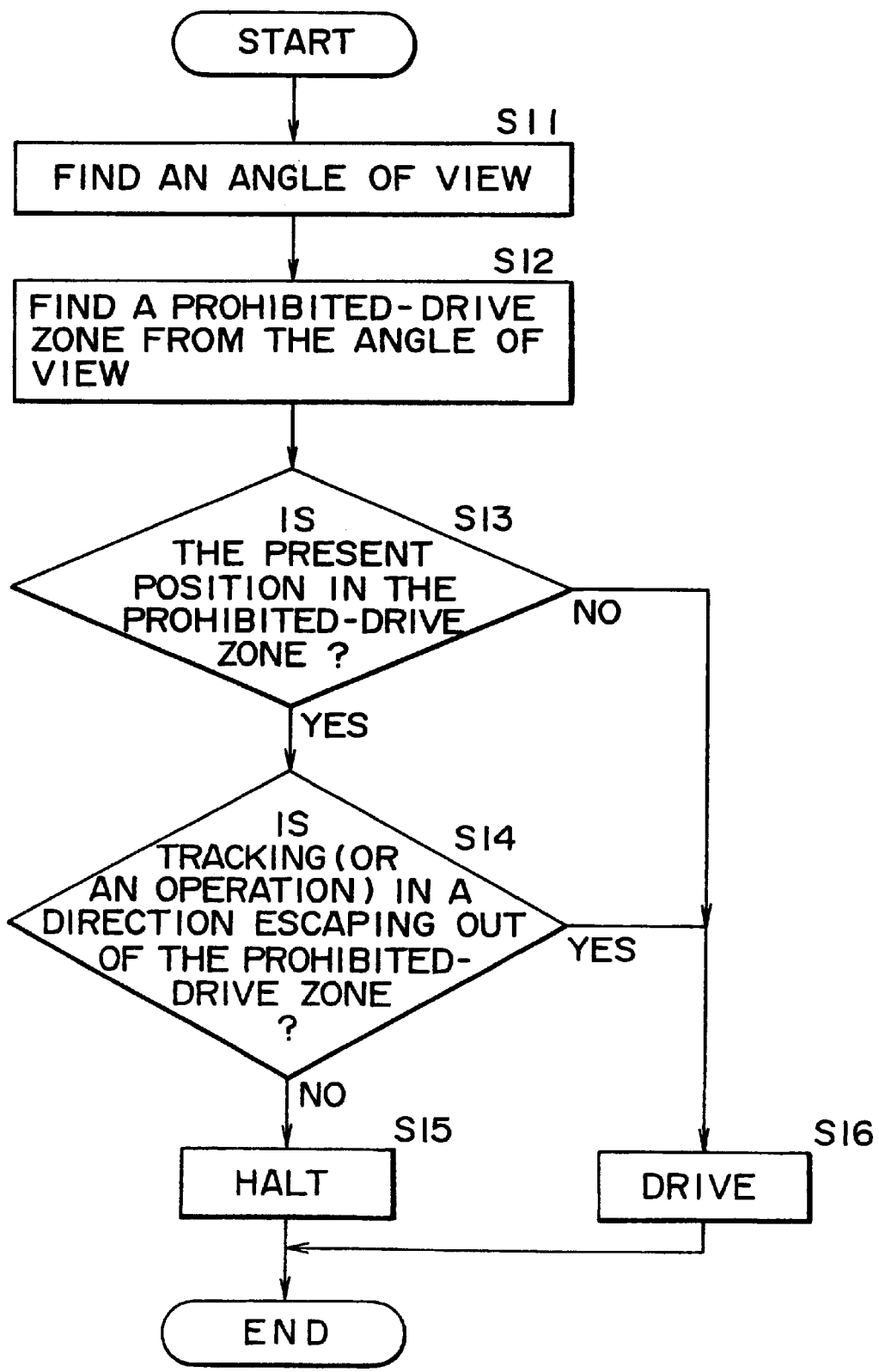
FIG. 8 is an explanatory schematic flow diagram showing detailed procedures of pieces of processing carried out at the steps S2 and S4 of the flowchart shown in FIG. 7.

Next, the operation of the limited automatic tracking is explained by referring to the flowchart shown in FIG. 8. As shown in the figure, the flowchart begins with a step S11 at which the motor control block 9 finds an angle of view of the lens block 1 from data representing the present position of the zoom lens 3 supplied by the zoom-lens position detector 14. The magnitude of the angle of vision shown in FIG. 4 or 5 is $2\times\alpha_1$ or $2\times\alpha_2$ respectively.

The processing flow then goes on to a step S12 at which a prohibited-drive range is found from the angle of view found at the step S11. In the case of the zoom lens 3 set at a wide angle as shown in FIG. 4, the prohibited-drive range is found as an angle $\theta_1$ which is obtained by adding an angle $\alpha_1$, half the magnitude of the angle of vision found at the step S11, to the angle $\theta_0$ found in a way explained earlier by referring to FIG. 6. The angle $\theta_1$ is a minimum angle which the line segment AB and the optical axis of the lens block 1 are allowed to form when the lens block 1 is fully driven to the left. The prohibited-drive range is thus from the angle 0 to the angle $\theta_1$.

The processing flow then continues to a step S13 to form a judgment as to whether or not the lens block 1 is at the present time positioned in the prohibited-drive range, that is, whether or not the angle β formed by the optical axis of the lens block 1 indicated by a dotted line and the line segment AB is within the prohibited-drive range between the angle 0 and the angle $\theta_1$ as shown by a relation (3).

$$\beta \leq \theta_1 \quad (3)$$

If the angle β formed by the optical axis and the line segment AB is within the prohibited-drive range between the angle 0 and the angle $\theta_1$, the processing flow goes on to a step S14 to form a judgment as to whether or not the motor control block 9 is carrying out an operation to keep track of a photographic object in accordance with an image signal supplied by the photographic-object recognizing block 8 in a direction escaping out of the prohibited-drive range. It should be noted that processing carried out at the step S14 will be explained in detail by referring to FIG. 10 later. If the motor control block 9 is carrying out an operation to keep track of a photographic object not in a direction escaping out of the prohibited-drive range, the processing flow goes on to a step S15 at which the driving of the lens block 1 is terminated. In this way, the direction of the optical axis of the lens block 1 can be prevented from deviating away from the allowed-drive range further than the present position.

If the outcome of the judgment formed at the step S13 indicates that the angle β formed by the optical axis and the line segment AB is outside the prohibited-drive range between the angle 0 and the angle $\theta_1$ or the outcome of the judgment formed at the step S14 indicates that the motor control block 9 is carrying out an operation to keep track of a photographic object in accordance with an image signal supplied by the photographic-object recognizing block 8 in a direction escaping out of the prohibited-drive range, on the other hand, the processing flow goes on to a step S16 at which the motor control block 9 controls the lens block 1 to perform normal tracking driving.

To put it in detail, the motor control block 9 is driving the panning and tilting motors 11 and 12 in accordance with an image signal supplied by the photographic-object recognizing block 8 to keep track of a photographic object 21. At that time, the motor control block 9 finds the angle of view and the orientation of the optical axis of the lens block 1 from the data representing the position of the lens block 1 supplied by the lens-block position detector 13 and the data representing the position of the zoom lens 3 supplied by the zoom-lens position detector 14, carrying out control so as to prevent the lens block 1 from getting in the prohibited-drive range.

Figure 9:
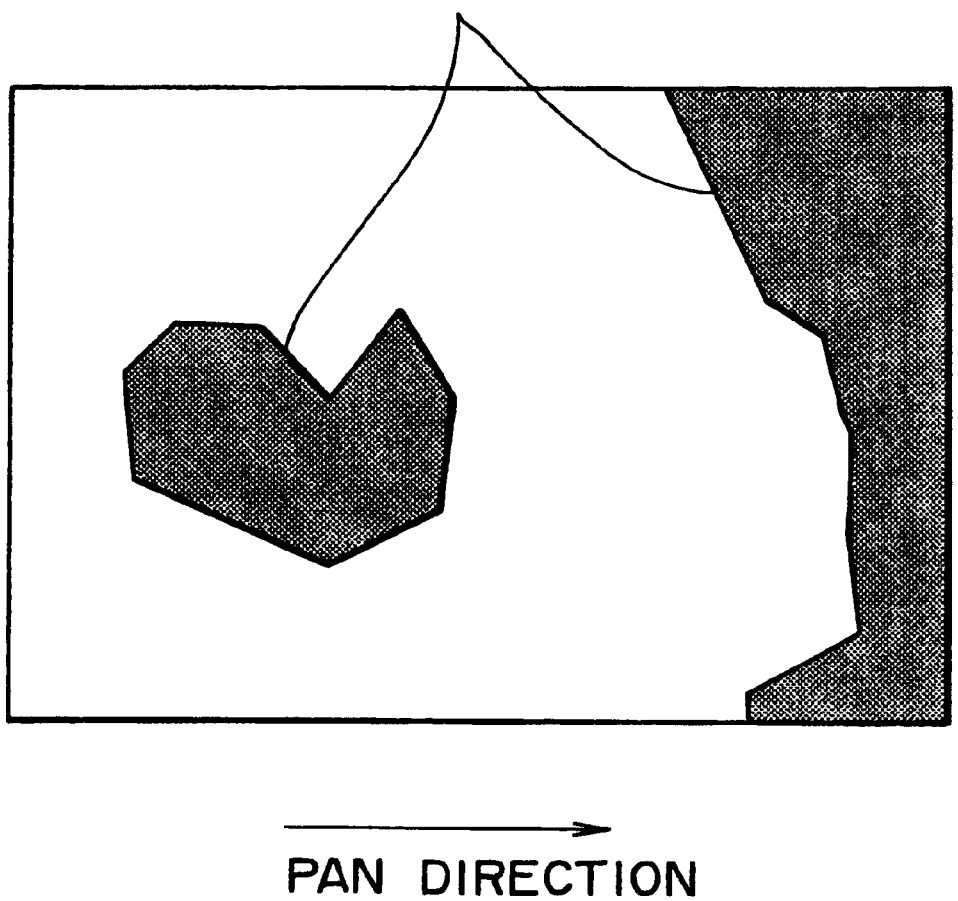
FIG. 9 is a diagram showing prohibited-drive zones in an image space that can be photographed by the lens block 1.

Let us consider, for example, a case in which prohibited-drive zones are set in an image space photographable by the lens block 1 as shown in FIG. 9 and the lens block 1 is driven not to photograph the zones. Here, only the driving of the lens block 1 in the pan direction is explained. It should be noted that the driving of the lens block 1 in the tilt direction is basically the same as that in the pan direction. Thus, the explanation of the driving of the lens block 1 in the tilt direction is omitted. As shown in the figure, in the pan direction, a plurality of prohibited-drive zones are set.

Figure 10:
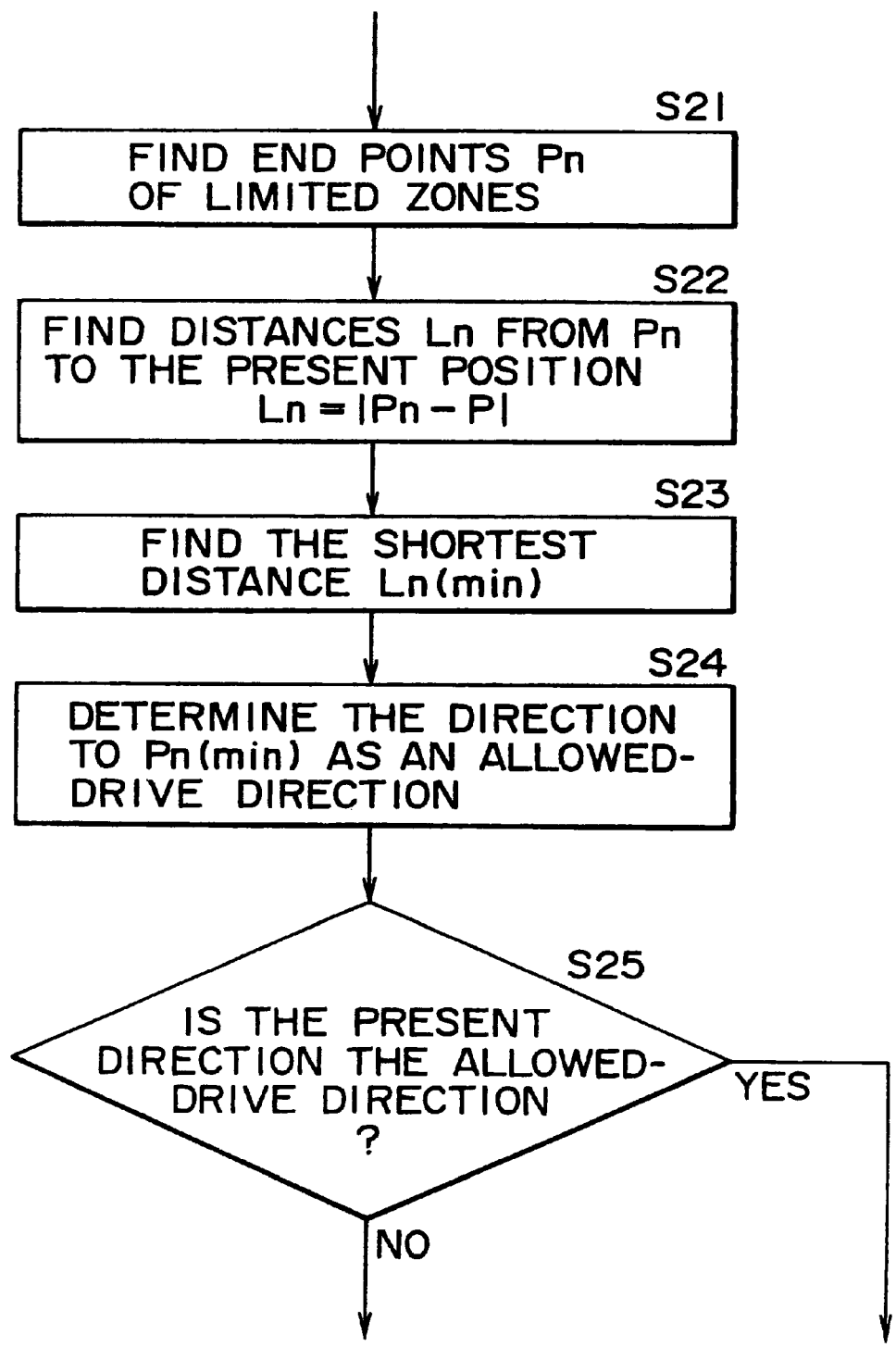
FIG. 10 is an explanatory schematic flow diagram showing a detailed procedure of processing carried out at the steps S14 of the flowchart shown in FIG. 8.
Figure 11:
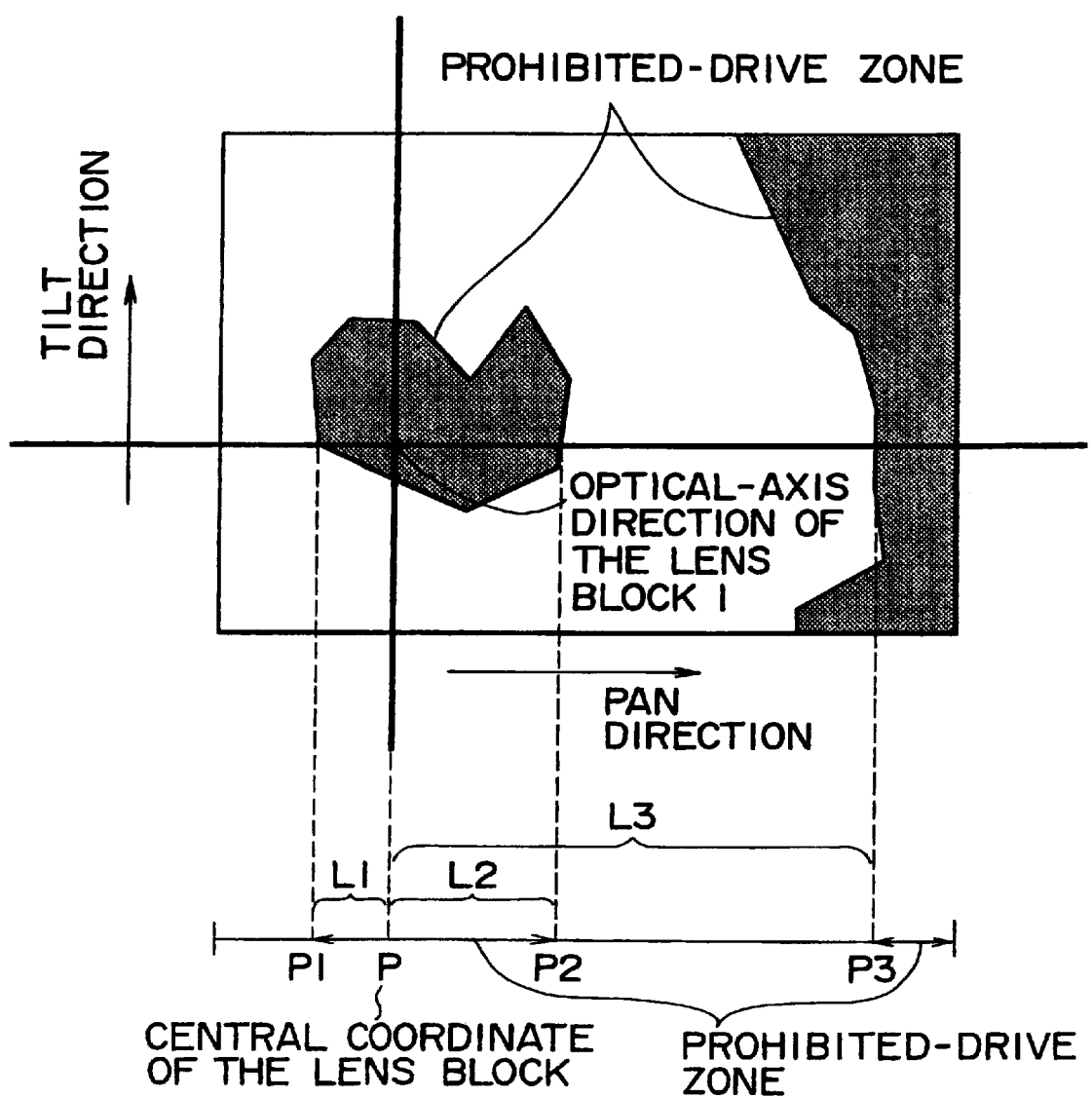
FIG. 11 is an explanatory diagram showing a method for escaping out of a prohibited-drive zone.

Next, the processing carried out at the step S14 of the flowchart shown in FIG. 8 is explained in detail by referring to a flowchart shown in FIG. 10. As shown in FIG. 10, the flowchart begins with a step S21 at which the motor control block 9 finds end points Pn, where n=1, 2 and 3, of limited zones (that is, the prohibited-drive zones) as shown in FIG. 11. A rectangle shown in FIG. 11 is an image space that can be photographed by the lens block 1 and dark portions thereof are the prohibited-drive zones. The cross point of vertical and horizontal line segments represents the direction of the optical axis of the lens block 1.

A horizontal straight line drawn at the bottom of the figure represents a cross section of the image space cut out along a line passing through the cross point in the pan direction perpendicular to the tilt direction. Segments of the horizontal straight line represent the prohibited-drive zones. The lens block 1 can be driven in the pan or tilt direction along these segments.

The processing flow then goes on to a step S22 at which the distances Ln, where n=1 to 3, from the present position P to the end points Pn are found. The distances Ln can be found by subtracting the coordinate of the present position P from the end points Pn and taking the absolute values of the differences resulting from the subtract operations. That is to say, the distances L1 to L3 are found by using the following equations.

$$L1=|P1-P|$$

$$L2=|P2-P|$$

$$L3=|P3-P|$$

The processing flow then proceeds to a step S23 at which the shortest distance Ln (min) among the distances Ln found at the step S22 is identified. The shortest distance is also denoted by notation Lk where k=1, 2 or 3. In the example shown in FIG. 11, since the shortest distance Lk is the distance L1 from the present point P representing the central coordinate of the lens block 1 to the end point P1, k=1.

The processing flow then continues to a step S24 at which a direction toward the point Pn (min) located at a location separated away from the central coordinate of the lens block 1 by the shortest distance Lk where k=1 identified at the step S23 is taken as a derivable direction. It should be noted that notation Pn (min) is used to denote a point with the shortest distance from the present point P. The point Pn (min) is also denoted by notation Pk. In this case, k is 1. In brief, a direction toward the point P1 is taken as a derivable direction.

The processing flow then goes on to a step S25 to form a judgment as to whether or not a driving direction in which an attempt is made by the motor control block 9 to drive the lens block 1 by controlling the panning motor 11 coincides with the derivable direction determined at the step S24. If the outcome of the judgment indicates that the driving direction of the lens block 1 does not coincide with the derivable direction determined at the step S24, that is, in the case of the example shown in FIG. 11, if the lens block 1 is driven to the right, the processing flow goes on to the step S15 of the flowchart shown in FIG. 8. At the step S15, the driving of the lens block 1 is discontinued. If the outcome of the judgment formed at the step S25 indicates that the driving direction of the lens block 1 coincides with the derivable direction determined at the step S24, that is, in the case of the example shown in FIG. 11, if the lens block 1 is driven to the left, on the other hand, the processing flow goes on to the step S16 of the flowchart shown in FIG. 8. At the step S16, driving of the lens block 1 to the left is continued.

If the operation unit 16 is operated to enter a drive command (that is, a direction driving command or a direction command) requesting that the lens block 1 be driven in a predetermined direction while the motor control block 9 is driving the panning and tilting motors 11 and 12 in accordance with data output by the photographic-object recognizing block 8 in an operation to keep track of a photographic object 21 as described above, the motor control block 9 drives the panning and tilting motors 11 and 12 in accordance with the direction driving command received from the operation unit 16, taking precedence of the data supplied by the photographic-object recognizing block 8.

Even if the operation unit 16 is manually operated to drive the lens block 1 as such, the tracking system can be controlled so that the lens block 1 does not take a picture of a body in a prohibited-drive zone in basically the same way as the automatic tracking which has been described earlier by referring to FIGS. 8 and 10. It should be noted, however, that a prohibited-drive zone in an operation to drive the lens block 1 by manually operating the operation unit 16 does not have to be the same as a prohibited-drive zone set for the automatic tracking. That is to say, a prohibited-drive zone different from a prohibited-drive zone for the automatic tracking can be set in an operation to drive the lens block 1 by manually operating the operation unit 16.

Thus, even in the case of a body which is not to be photographed in automatic tracking because the body is no more than a body easily recognizable incorrectly as a certain photographic object of the automatic tracking, for example, the user can treat the body as a photographic object when the user drives the lens block 1 by operating the operation unit 16.

To put it in detail, the user operates the operation unit 16 in order to drive the motor control block 9 which, in turn, drives the panning and tilting motors 11 and 12 in accordance with commands supplied to the motor control block 9 by the operation unit 16. As a result, panning or tilting driving is carried out on the lens block 1 in accordance with manual operations done by the user on the operation unit 16. Therefore, in this case, the image signal supplied by the photographic-object recognizing block 8 is not used. As an alternative, when the operation unit 16 is operated manually, the operation of the photographic-object recognizing block 8 can be disabled.

While the lens block 1 is being driven in a certain direction by a manual operation carried on the operation unit 16, the lens-block position detector 13 keeps track of the position of the lens block 1 at predetermined time intervals, continuously supplying data representing the position of the lens block 1 to the motor control block 9. An example of such data is an angle formed by the line segment AB and the optical axis of the lens block 1 in the case of the driving direction shown in FIG. 4. The motor control block 9 then forms a judgment as to whether or not the optical axis of the lens block 1 is in the prohibited-drive zone based on the data supplied thereto. The forming of this judgment corresponds to the processing carried out at the step S13 of the flowchart shown in FIG. 8.

Then, the motor control block 9 forms a judgment as to whether or not the driving direction of the lens block 1 set by manually operating the operation unit 16 is a direction escaping out of the prohibited-drive zone. The forming of this judgment corresponds to the processing carried out at the step S14 of the flowchart shown in FIG. 8. Details of the processing are basically the same as those described earlier by referring to FIG. 10. However, at the step S25 of the flowchart shown in FIG. 10, the motor control block 9 forms a judgment as to whether or not the driving direction of the lens block 1 set by manually operating the operation unit 16 is a derivable direction set at the step S24.

If the outcome of the judgment indicates that the driving direction of the lens block 1 set by manually operating the operation unit 16 does not coincide with the derivable direction determined at the step S24, the processing flow goes on to the step S15 of the flowchart shown in FIG. 8. At the step S15, the driving of the lens block 1 is discontinued. If the outcome of the judgment indicates that the driving direction of the lens block 1 set by manually operating the operation unit 16 coincides with the derivable direction determined at the step S24, on the other hand, the processing flow goes on to the step S16 of the flowchart shown in FIG. 8. At the step S16, driving of the lens block 1 to the left is normally continued. In this case, the lens block 1 is driven in accordance with the manual operation of the operation unit 16.

If the user operates the operation unit 16 incorrectly so that the optical axis of the lens block 1 would be inadvertently driven in a direction toward the prohibited-drive zone, for example, the driving of the lens block 1 is halted. As a result, it is possible to prevent a body 22 existing in a prohibited-drive zone not to be photographed from being photographed even if the user operates the operation unit 16 incorrectly.

In addition, even if the orientation of the optical axis of the lens block 1 is in a direction toward a prohibited-drive zone for some reasons, the motor control block 9 drives the panning and tilting motors 11 and 12 to carry out panning and tilting driving on the lens block 1 in driving directions specified by a manual operation carried out by the user on the operation unit 16 only if the driving directions are directions in which the optical axis of the lens block 1 escapes out of the prohibited-drive zone. In this way, even if the worst comes to the worst, the lens block 1 will merely sustain the orientation thereof as it is. If panning and tilting driving is carried out on the lens block 1, the panning and tilting driving will cause the lens block 1 to approach the allowed-drive range.

In addition, much like the automatic tracking, if the angle of view changes, the allowed-drive range of the lens block 1 itself also varies in accordance with the change in angle of view. For example, the zoom lens 3 can be driven into a wide angle as shown in FIG. 4 to include a body 22 not to be photographed in the angle of view or into a telescope angle as shown in FIG. 5 to exclude the body 22. By varying the allowed-drive range in accordance with the angle of view as described above, it is possible to prevent generation of a range in which the lens block 1 can be driven only in one direction, in spite of the fact that the zoom lens 3 can be driven into a wide angle to form an angle of vision including the recognized incorrectly body 22 or driven into a telescope angle to form an angle of vision excluding the recognized incorrectly body 22.

For example, a range represented by an angle $\theta_{11}$ shown in FIG. 5 is a prohibited-drive range in the case of a wide zoom but an allowed-drive range in the case of a telescope zoom. As described earlier, in the allowed-drive range, the lens block 1 can be driven in the right or left direction. That is to say, if the zoom is set at a telescope angle, the driving range of the lens block 1 is widened to the left in comparison with that of the zoom set at a wide angle. Conversely, as the zoom is driven to form a wide angle, the driving range of the lens block 1 is narrowed to the right. As a result, by varying the allowed-drive range and, thus, the prohibited-drive range in accordance with the angle of view, the lens block 1 can be driven over a maximum driving range with an angle of view not including a body 22 not to be photographed without regard to the angle of view.

In addition, when the lens block 1 is driven in a direction without a limit by manually operating the operation unit 16 at the step S5 of the flowchart shown in FIG. 7, the lens block 1 can be moved temporarily in a direction toward a body in a prohibited-drive zone to take a picture of the body even if the body can not be photographed in the automatic tracking because of its existence in the prohibited-drive zone.

Figure 12:
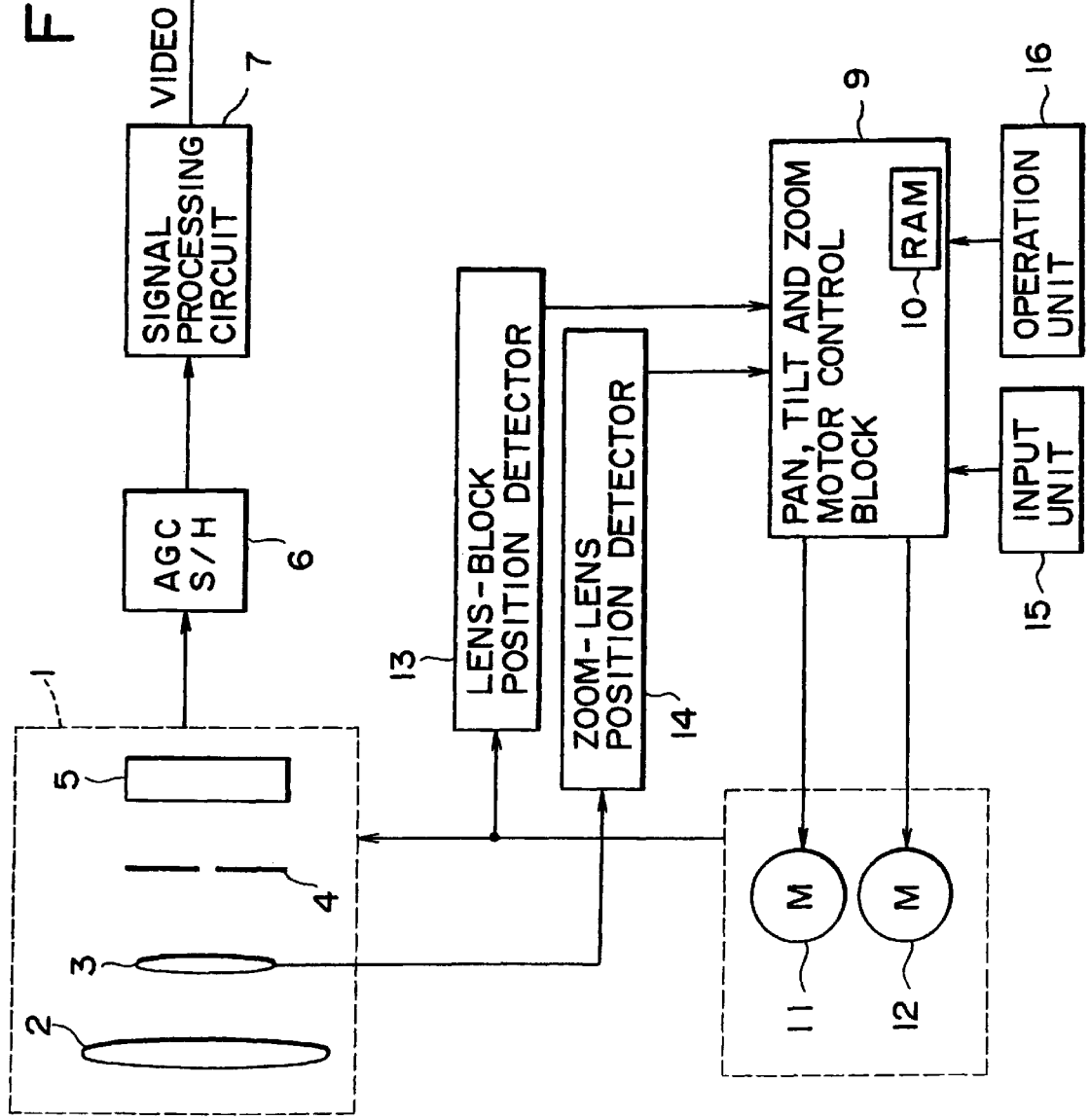
FIG. 12 is a block diagram showing the configuration of an embodiment implementing a pan/tilter system to which the control apparatus provided by the present invention is applied.

FIG. 12 is a block diagram showing the configuration of an embodiment implementing a pan/tilter system to which the control apparatus provided by the present invention is applied. As shown in the figure, the pan/tilter system has the same configuration as the tracking system shown in FIG. 1 except that the photographic-object recognizing block 8 is eliminated. Since the remaining part of the configuration is the same as that of the tracking system shown in FIG. 1, no detailed explanation of the remaining part is given. The operation of the pan/tilter system is the same as the processing of driving in a direction with a limit in accordance with a manual operation of the operation unit 16 employed in the tracking system shown in FIG. 1, that is, the processing carried out at the step S4 of the flowchart shown in FIG. 7. For this reason, no explanation of the operation of the pan/tilter system is given.

When the user manually operates the operation unit 16 of the pan/tilter system shown in FIG. 12 to specify a driving direction, panning or tilting driving is carried out in the specified direction. However, control is exercised so that the lens block 1 does not take a picture of a body 22 existing in a prohibited-drive zone. As a result, even if the operation unit 16 is manually operated, it is possible to prevent a body 22 not to be photographed from being photographed.

While the present invention has been described with reference to the first and second illustrative embodiments, the description is not intended to be construed in a limiting sense. That is to say, it is to be understood that the subject matter encompassed by the present invention is not limited to the two embodiments. For example, in the case of the embodiments described above, the image space is divided into one or two prohibited-drive zones and one allowed-drive zone. It should be noted that the image space can also be divided into a plurality of prohibited-drive zones and a plurality of allowed-drive zones.

What is claimed is:

1. A control apparatus comprising:
   an image taking means for photographing an image of a predetermined photographic object;
   a driving means for driving said image taking means in any arbitrary direction;
   a photographic-object detecting means for detecting a position of said photographic object on said image photographed by said image taking means;
   a first control means for controlling said driving means so as to minimize the magnitude of a displacement of said position of said photographic object detected by said photographic-object detecting means from a predetermined reference position on said image;
   a dividing means for dividing a space photographable by said image taking means into first and second spaces in accordance with the position detected by said photographic-object detecting means, said first space allowing said image taking means to photograph an image thereof and said second space inhibiting said image taking means from photographing an image thereof; and
   a second control means for finding a driving range allowing said image taking means to be driven therein and for driving said image taking means only within said driving range so as to prevent said image taking means from photographing an image of said second space.

2. A control apparatus according to claim 1 wherein, if an image to be photographed by said image taking means includes said second space, said second control means controls said driving means so that a photographing direction in which an image is to be photographed by said image taking means approaches said first space closest to said image to be photographed by said image taking means.

3. A control apparatus according to claim 1 wherein said apparatus further comprises:
   an angle-of-view detecting means for detecting an angle of view of said image taking means; and
   an adjustment means for adjusting said driving range in accordance with said angle of view detected by said angle-of-view detecting means.

4. A control apparatus according to claim 1 further having a command issuing means for issuing a command specifying a driving direction of said driving means wherein, if said command issuing means issues a command to drive said image taking means to a position outside said driving range, said driving means drives said image taking means to said position outside said driving range.

5. A control apparatus according to claim 1 wherein said dividing means divides said space photographable by said image taking means into one or a plurality of first spaces each allowing said image taking means to photograph an image thereof and one or a plurality of second spaces each inhibiting said image taking means from photographing an image thereof.

6. A control apparatus according to claim 1 wherein, if an image to be photographed by said image taking means includes said second space, said second control means drives said driving means when said driving means is controlled by said first control means in a driving direction approaching said first space but said second control means does not drive said driving means when said driving means is controlled by said first control means in a driving direction escaping out of said first space.

7. A control apparatus according to claim 1 further having a command issuing means for manually issuing a command specifying a driving direction of said image taking means wherein, when said command issuing means is operated (manually), said driving means drives said image taking means within said driving range in accordance with said command issued by said command issuing means.

8. A control apparatus according to claim 7 wherein said first space, said second space and said driving range with said driving means controlled by said first control means are each different in size from said first space, said second space and said driving range with said driving means controlled by a command issued by said command issuing means.

9. A control apparatus comprising:

an image taking means for photographing an image of a predetermined photographic object;

a driving means for driving said image taking means in any arbitrary direction;

a dividing means for dividing a space photographable by said image taking means into first and second spaces in accordance with a position corresponding to the photographed image of said predetermined photographic object, said first space allowing said image taking means to photograph an image thereof and said second space inhibiting said image taking means from photographing an image thereof;

a command issuing means for issuing a command specifying a driving direction of said image taking means;

a first control means for controlling said driving means so as to drive said image taking means in a driving direction specified by a command issued by said command issuing means; and a second control means for finding a driving range allowing said image taking means only to be driven therein and for driving said image taking means only within said driving range so as to prevent said image taking means from photographing an image of said second space.

10. A control apparatus according to claim 9 wherein, if an image to be photographed by said image taking means includes said second space, said second control means controls said driving means so that a photographing direction in which an image is to be photographed by said image taking means approaches said first space closest to said image to be photographed by said image taking means.

11. A control apparatus according to claim 9 wherein said apparatus further comprises:

an angle-of-view detecting means for detecting an angle of view of said image taking means; and an adjustment means for adjusting said driving range in accordance with said angle of view detected by said angle-of-view detecting means.

12. A control apparatus according to claim 9 wherein said dividing means divides said space photographable by said image taking means into one or a plurality of first spaces each allowing said image taking means to photograph an image thereof and one or a plurality of second spaces each inhibiting said image taking means from photographing an image thereof.

13. A control apparatus according to claim 9 wherein, if an image to be photographed by said image taking means includes said second space, said second control means drives said driving means when said driving means is controlled by said first control means in a driving direction approaching said first space but said second control means does not drive said driving means when said driving means is controlled by said first control means in a driving direction escaping out of said first space.

14. A control method comprising the steps of:

photographing an image of a predetermined photographic object by using a predetermined image taking means;

detecting a position of said photographic object on said image photographed by said image taking means;

controlling a driving means so as to minimize the magnitude of a displacement of said detected position of said photographic object from a predetermined reference position on said image;

dividing a space photographable by said image taking means into first and second spaces in accordance with the detected position, said first space allowing said image taking means to photograph an image thereof and said second space inhibiting said image taking means from photographing an image thereof; and finding a driving range allowing said image taking means to be driven therein and driving said image taking means only within said driving range so as to prevent said image taking means from photographing an image of said second space.

15. A control method comprising the steps of:

photographing an image of a predetermined photographic object by using a predetermined image taking means;

dividing a space photographable by said image taking means into first and second spaces in accordance with a position corresponding to the photographed image of said predetermined photographic object, said first space allowing said image taking means to photograph an image thereof and said second space inhibiting said image taking means from photographing an image thereof;

issuing a command specifying a driving direction of said image taking means;

controlling a driving means so as to drive said image taking means in a driving direction specified by said command; and finding a driving range allowing said image taking means to be driven therein and driving said image taking means only within said driving range so as to prevent said image taking means from photographing an image of said second space.

* * * * *